United States Patent [19]
Ito et al.

[11] Patent Number: 5,802,316
[45] Date of Patent: Sep. 1, 1998

[54] ROUTERS CONNECTING LANS THROUGH PUBLIC NETWORK

[76] Inventors: Yuji Ito, c/o NEC Shizuoka, Ltd., 4-2, Shimomata, Kakegawa-shi, Shizuoka; Minoru Sekine, c/o NEC Corporation, 7-1, Shiba 5-chome, Minato-ku, Tokyo, both of Japan

[21] Appl. No.: 592,581

[22] Filed: Jan. 26, 1996

[30] Foreign Application Priority Data

Jan. 26, 1995 [JP] Japan ................................. 7-010505

[51] Int. Cl.⁶ ..................... H04L 12/28; H04L 12/66
[52] U.S. Cl. ..................... 395/200.79; 395/200.68; 395/200.72; 370/351
[58] Field of Search ................. 395/200.01, 200.15, 395/200.16, 200.3, 200.48, 200.72, 200.68, 200.79; 370/351

[56] References Cited

U.S. PATENT DOCUMENTS 5,351,237  9/1994  Shinohara et al. ................ 370/392
5,459,719  10/1995  Hayashi ............................. 370/236
5,495,480  2/1996  Yoshida ............................. 370/389
5,517,620  5/1996  Hashimoto et al. ............. 395/200.15
5,530,963  6/1996  Moore et al. .................... 395/200.73
5,583,996  12/1996  Tsuchiya ......................... 395/200.48

*Primary Examiner*—Alyssa H. Bowler
*Assistant Examiner*—Walter D. Davis, Jr.
*Attorney, Agent, or Firm*—Scully, Scott, Murphy & Presser

[57] ABSTRACT

A router includes a routing table containing flags each representing a public-network side or a LAN side. A path for a received packet is determined such that the packet is forwarded to the next node through the LAN according to the next node address when the flag corresponding to the specified destination represents the LAN side, and the packet is forwarded to the next node through the public network according to the next node address when the flag represents the public network side. When a change of the routing information sets is monitored, the routing table is searched for the second router having the flag representing the public network side and then the changed routing information sets are transmitted to the second router.

9 Claims, 7 Drawing Sheets

ROUTING TABLE 302

| DESTINATION IP ADDRESS | MASK ADDRESS | NUMBER OF HOPS | NEXT ROUTER ADDRESS | FLAG | NAME OF INTERFACE |
|---|---|---|---|---|---|
| a.a.a.0 | ff.ff.ff.0 | 1 | — | | LAN-IF 203a |
| b.b.b.0 | ff.ff.ff.0 | 1 | — | | LAN-IF 203b |
| c.c.c.0 | ff.ff.ff.0 | 1 | — | | LAN-IF 203c |
| d.d.d.0 | ff.ff.ff.0 | 1 | c.c.c.1 | LAN | LAN-IF 203c |
| ...... | ...... | ...... | ...... | ...... | ...... |
| e.e.e.0 | ff.ff.ff.0 | 1 | aaabbbb | PN | PN-IF 205 |
| f.f.f.0 | ff.ff.ff.0 | 1 | aaabbbb | PN | PN-IF 205 |

FIG. 3

ROUTERS CONNECTING LANS THROUGH PUBLIC NETWORK

BACKGROUND OF THE INVENTION

1. Field of the Invention

The present invention generally relates to a network comprising LANs (local-area networks), and in particular to routers which transfer packets between LANs through a public network.

2. Description of the Related Art

Generally, a router receives a packet from a node of a network or another router and passes this packet on to a destination specified in an embedded packet. Especially, a router which connects several LANs with a public network has to be provided with a routing table as well as another table containing the relationship between IP (Internet Protocol) addresses and public telephone numbers.

Referring to FIG. 1, such a router 1 is comprised of a routing processor 2 including the routing table 3 and the IP address-to-public telephone number relationship table 4, and further a routing protocol processor 5, a network control unit 6 and a public network interface 7. The public network interface 7 is connected to a public network 8 which is in turn connected to another router 9 having the same circuit configuration as the router 1. The routing table 3 generally has a predetermined fields consisting of destination IP address, mask address, number of hops, next router IP address, and interface name. The table 4 consists of two fields: next router IP address and public telephone number.

When receiving a packet from a LAN through the corresponding LAN interface, the routing processor 2 searches the routing table 3 for the destination IP address embedded in the received packet and reads the next router IP address of the router 9 corresponding to the destination IP address from the routing table 3. Subsequently, the routing processor 2 finds the public telephone number of the next router 9 by searching the IP address-to-public telephone number relationship table 4 for the next router IP address. Using this public telephone number of the next router 9, the routing processor 2 performs the line connection to the router 9 through the public network 8.

However, the conventional LAN router finds the IP address of the next router 9 from the routing table 3 and then uses this IP address of the next router 9 to search the IP address-to-public telephone number relationship table 4 for the corresponding telephone number. Therefore, the routing processor 2 needs not only double IP addresses but two searching operations of the tables 3 and 4, respectively, before transmitting a connection request to the public network. This is an obstacle to reduction in the time required for routing operations.

Furthermore, the conventional router periodically transmits routing information packets to the LANs connected through the public network, rising a problem of the increased connection charge of the public network.

SUMMARY OF THE INVENTION

An object of the present invention is to provide a router and routing method which achieve reductions in the time required for routing operations.

Another object of the present invention is to provide a router and routing information updating method which achieve reductions in connection charges through a public network.

A router according to the present invention is comprised of a routing table which contains flags each representing public-network or LAN in addition to well-known routing information. More specifically, the routing table contains a plurality of routing information sets corresponding to destinations, respectively. Each of the routing information sets includes the flag representing which side the destination is directed to, a LAN side or a public network side.

According to an aspect of the present invention, a path for a received packet is determined based on a specified destination of said packet as follows. When the flag corresponding to the specified destination represents the LAN side, the packet is forwarded to the next node through the LAN according to the next node address corresponding to the specified destination. On the other hand, when the flag represents the public network side, the packet is forwarded to the next node through the public network according to the next node address. In addition, when the LAN is the specified destination of the packet, the path for the received packet is determined such that the packet is forwarded to the LAN.

According to another aspect of the present invention, a change of the routing information sets is monitored at predetermined intervals. When the change of the routing information sets is monitored, the routing table is searched for the second router having the flag representing the public network side and then the changed routing information sets are transmitted to the second router. In addition, the routing information sets are periodically transmitted to the adjacent LANs connected to the router.

BRIEF DESCRIPTION OF THE DRAWINGS

FIG. 3 is a schematic diagram showing contents of a routing table employed in the embodiment;

DETAILED DESCRIPTION OF THE PREFERRED EMBODIMENTS

Figure 1:
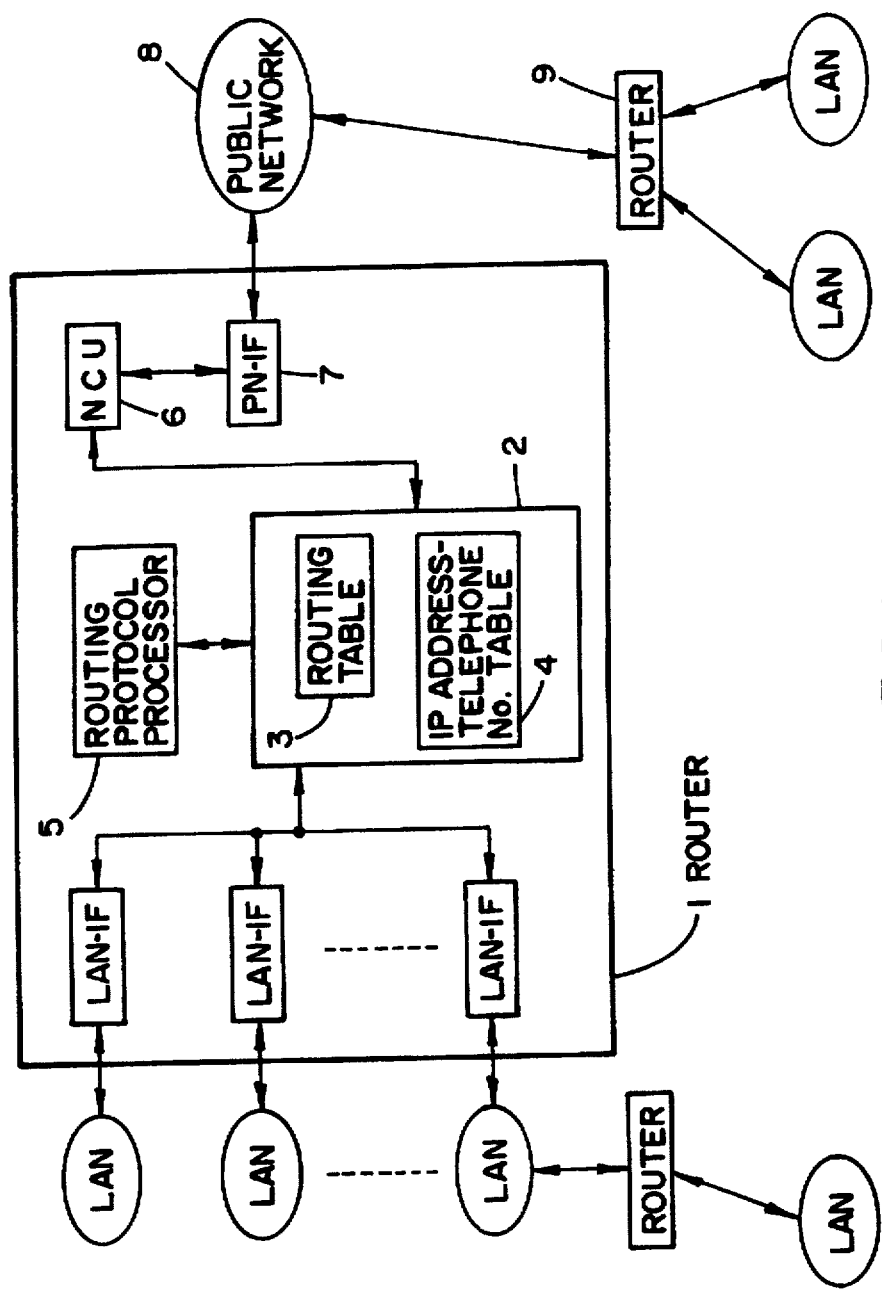
FIG. 1 is a block diagram showing the circuit configuration of a conventional LAN router.
Figure 2:
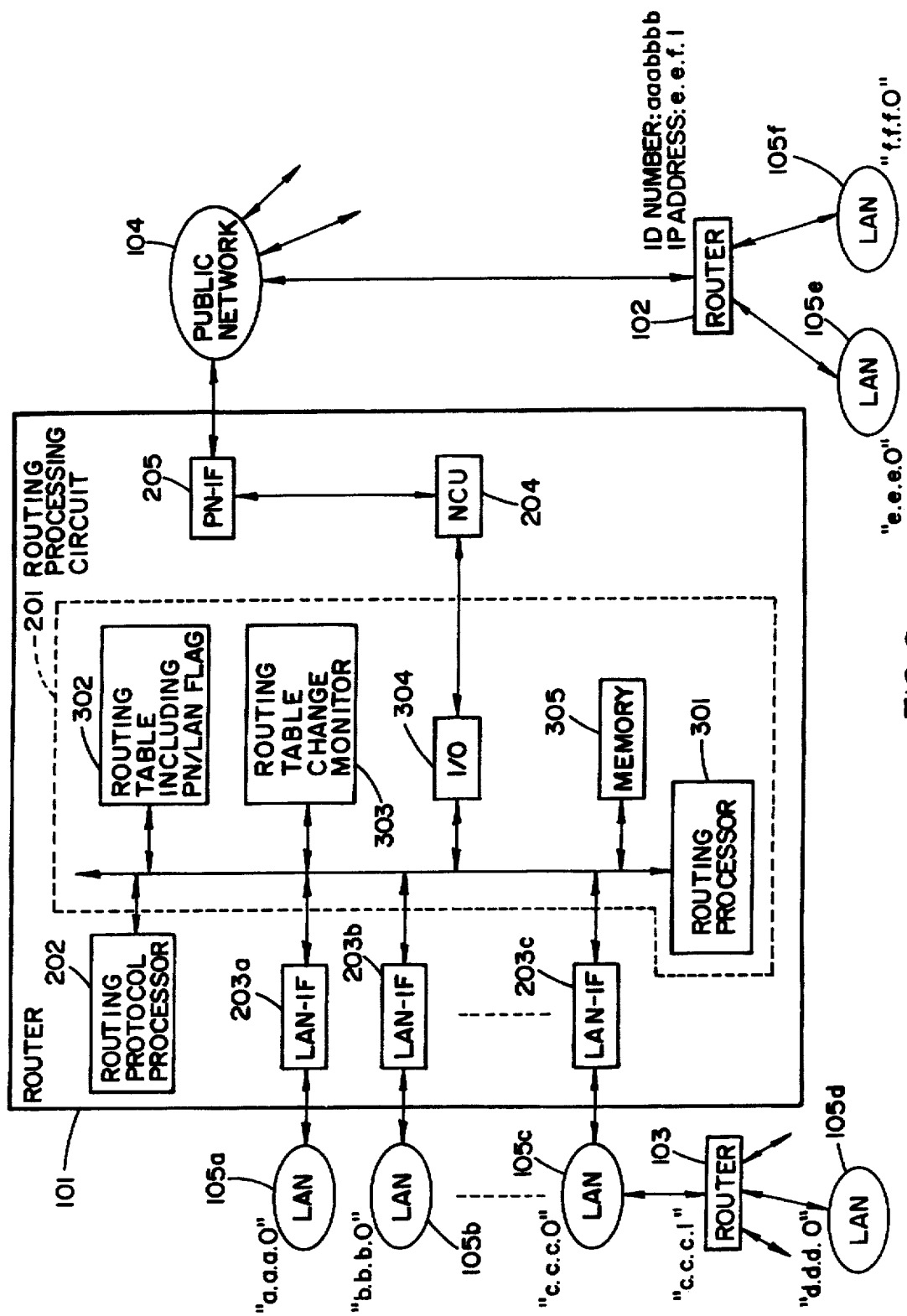
FIG. 2 is a block diagram showing the circuit configuration of a LAN router according to an embodiment of the present invention.

As illustrated in FIG. 2, it is assumed for simplicity that a network is comprised of routers 101–103, a public network 104, and a plurality of LANs 105a–105f. The router 101 can be connected to the router 102 through the public network 104 so as to transfer packets between one of LANs 105a–105c and one of LANs 105e and 105f. Similarly the router 103 transfers packets between the LAN 105c and the LAN 105d. Further, it is assumed that the LANs 105a–105f are previously provided with IP addresses "a.a.a.0", "b.b.b.0", "c.c.c.0", "d.d.d.0", "e.e.e.0", and "f.f.f.0", respectively, the router 102 with both IP address "e.e.f.1" and public ID number "aaabbbb", and the router 103 with IP address "c.c.c.1".

The respective routers 101–103 basically have the same circuit configuration as described hereinafter. Taking the router 101 as an example, it is comprised of a routing processing circuit 201, a routing protocol processor 202, LAN interface circuits (LAN-IFS) 203a–203c, a network control unit (NCU) 204, and a public network interface circuit (PN-IF) 205. The routing processing circuit 201 is connected to the LANs 105a–105c through the respective LAN interface circuits 203a–203c and is also connected to the public network 104 through the NCU 204 and the PK-IF 205.

The routing processing circuit 201 is comprised of a routing processor 301, a routing table 302, a routing table change monitor 303, an input/output controller 304, and other necessary circuits such as a memory 305 and a timer. The routing processor 301 performs routing operations according to the routing protocol. As described in detail later, the routing processor 301, referring to the routing table 302, finds a path for a packet received from the public network 104 or one of LANs 105a–105c. The routing information stored in the routing table 302 is periodically transmitted to the respective nodes of LANs 105a–105c which are directly connected to the router 101. Each node of the LANs 105a–105c having received the routing information from the router 101 updates its routing table using the received routing information. Furthermore, the routing table change monitor 303 monitors a change of the routing information. When the routing table 302 is changed, the change information is sent to the routing processor 301 which transmits the routing information to the router 102 through the public network 104. The router 102 updates its routing table using the routing information received from the router 101.

The routing table 302 according to the present embodiment has predetermined fields: destination IP address, mask address, number of hops, next router address, PN/LAN flag, and name of interface. As known well, the routing table 302 contains paths and distances between routers. Respective paths are represented by the destination IP address, the next router address, the PN/LAN flag, and the name of interface. Respective distances are represented by the number of hops.

For example, in cases where the destination of a received packet is the LAN 105a having the IP address "a.a.a.0", since the LAN 105a is directly connected to the router 101, the routing processor 301 selects the LAN-IF 203a by referring to the "name of interface" field in the routing table 302 and then transfers the packet to the LAN 105a directly. As another example, in cases where the destination of a received packet is the LAN 105d having the IP address "d.d.d.0", since the LAN 105d is connected to the router 101 through the LAN 105c and the router 103 (that is, the number of hops is "1", the next router address is "c.c.c.1", and the PM/LAN flag is "LAN"), the routing processor 301 selects the LAN-IF 203c referring to the "name of interface" field in the routing table 302 and then transfers the packet to the LAN 105c which in turn transfers it to the router 103. The router 103 transfers it to the ultimate destination LAN 105d in the same manner as the router 101. As still another example, in cases where the destination of a received packet is the LAN 105e having the IP address "e.e.e.0", since the LAN 105e is connected to the router 101 through the public network 104 and the router 102 (that is, the number of hops is "1", the next router address is "aaabbbb", and the PN/LAN flag is "PN"), the routing processor 301 selects the PN-IF 205 referring to the "name of interface" field in the routing table 302 and then transfers the packet to the router 102 through the public network 104. The router 102 transfers the packet to the ultimate destination LAN 105e in the same manner as the router 101.

More detailed operations of the router will be described hereinafter referring to flowcharts.

DATA COMMUNICATION BETWEEN LANs

Figure 4:
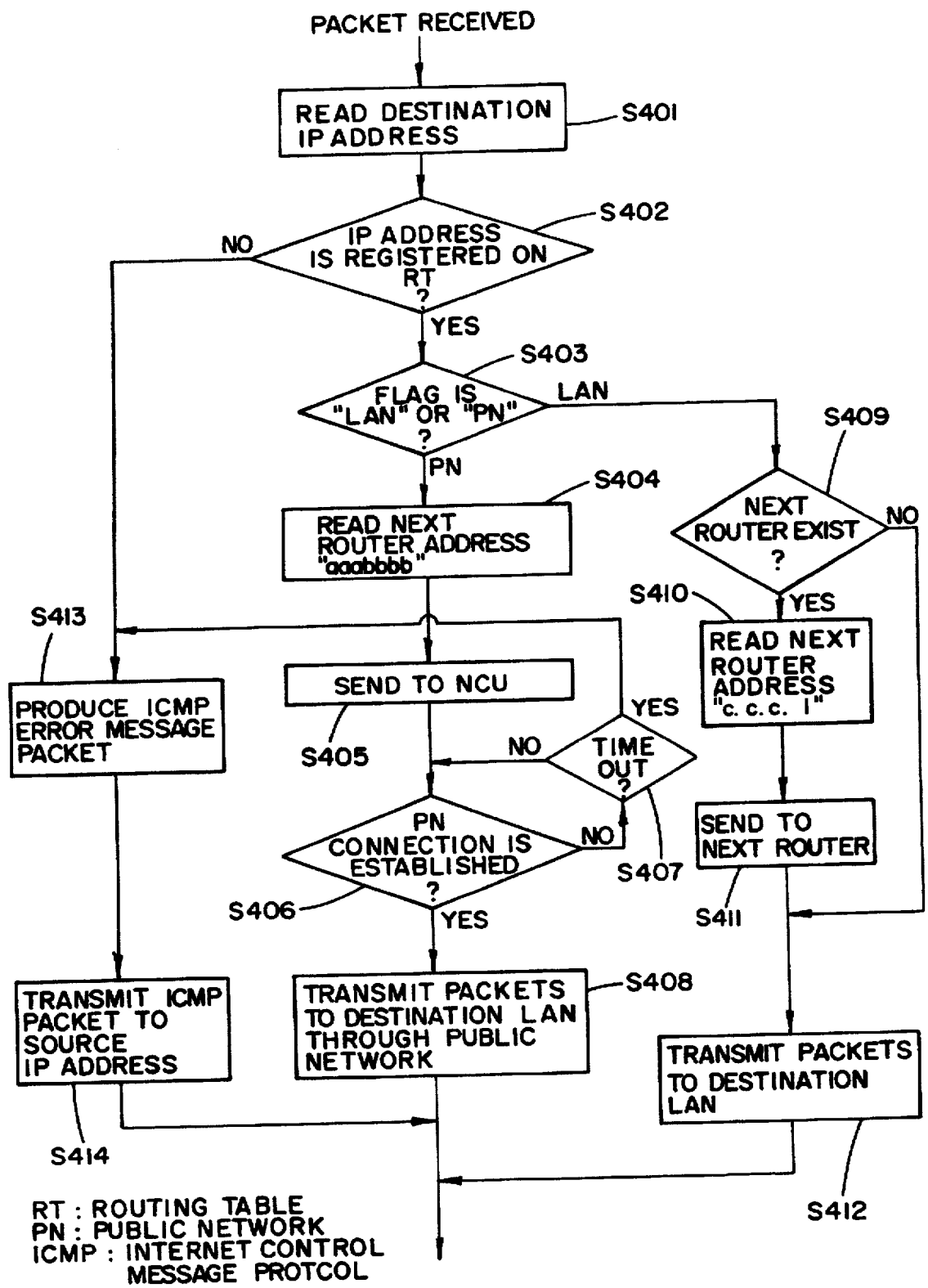
FIG. 4 is a flowchart showing an operation of the embodiment in data communication between LANs.

Referring to FIG. 4, when receiving a packet from a LAN (here LAN 105a), the LAN-IF 203a performs the MAC (media access control) processing of the received packet and then sends it to the routing processing circuit 201. In the routing processing circuit 201, the routing processor 301 reads the destination IP address from the header of the received packet (S401) and then searches the routing table 302 to check whether the destination IP address is registered on the routing table 302 (S402). If it is registered (Yes of S402), then it is checked whether the PN/LAN flag corresponding to the destination IP address in the routing table 302 indicates "LMN" or "PN" (S403).

If the PN/LAN flag indicates "PN", the routing processor 301 reads the next router address (here "aaabbbb") from the routing table 302 (S404) and then sends it to the NCU 204 which performs the well-known connection operation to the router 102 through the public network 104 (S405). If the public network connection between the routers 101 and 102 is established before time-out occurring (S406 and S407), the routing processor 301 transfers the packet to the router 102 through the public network 104 (S408) and then the router 102 transfers it to the ultimate destination LAN according to the destination IP address embedded in the header of the packet.

If the PN/LAN flag indicates "LAN", the routing processor 301 refers to the "number of hops" and the "next router address" of the routing table 302 to check whether a next router exists or not (S409). When the next router exists (Yes in S409), the routing processor 301 reads the next router IP address (here "c.c.c.1") from the routing table 302 (S410) and then sends the packet to the router 103 (S411). After that, data packets are transmitted to the ultimate destination LAN 105d (S412). In cases where the packet is of TCP (transmission control protocol), the LAN connection is established before the data packets are transmitted to the ultimate destination LAN 105d.

If the destination IP address of the packet is not registered on the routing table 302 (No of S402) or the time-out occurs (Yes of S407), the routing processor 301 produces an ICMP (internet control message protocol) error message packet (S413) and then transmits it to the source LAN 105a (S414).

ROUTING INFORMATION TRANSMISSION

Figure 5:
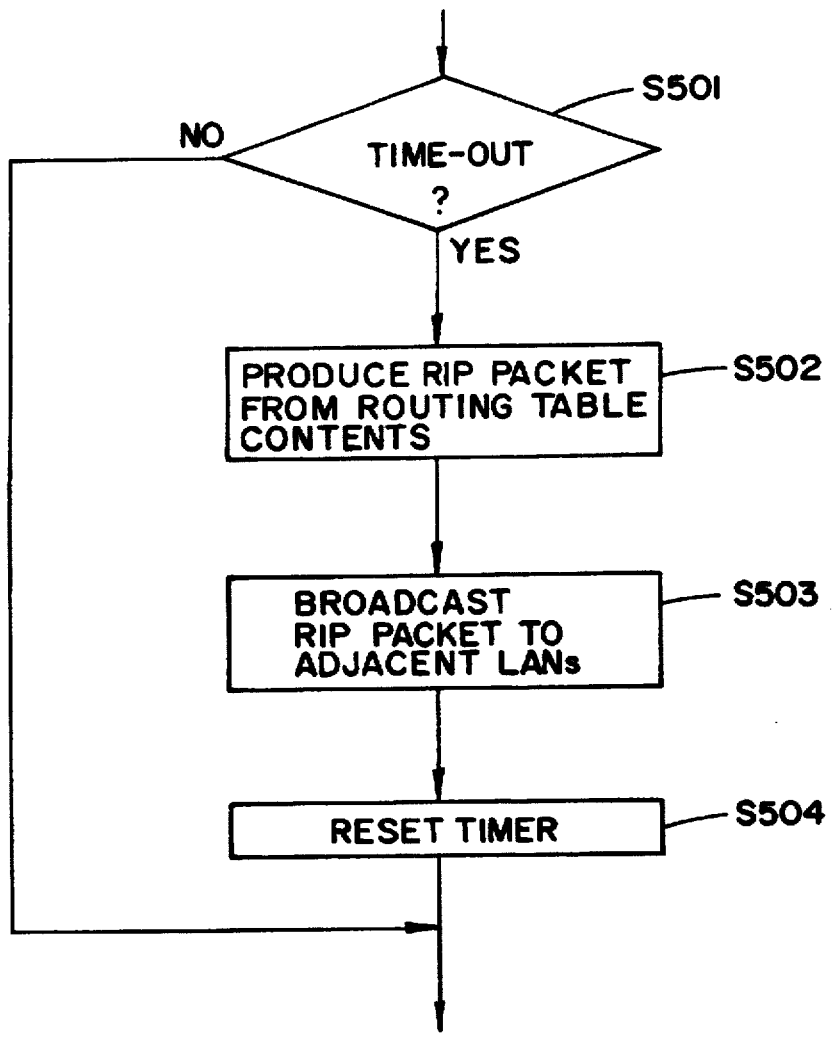
FIG. 5 is a flowchart showing an operation of the embodiment in routing information transmission to adjacent LANs.
Figure 6:
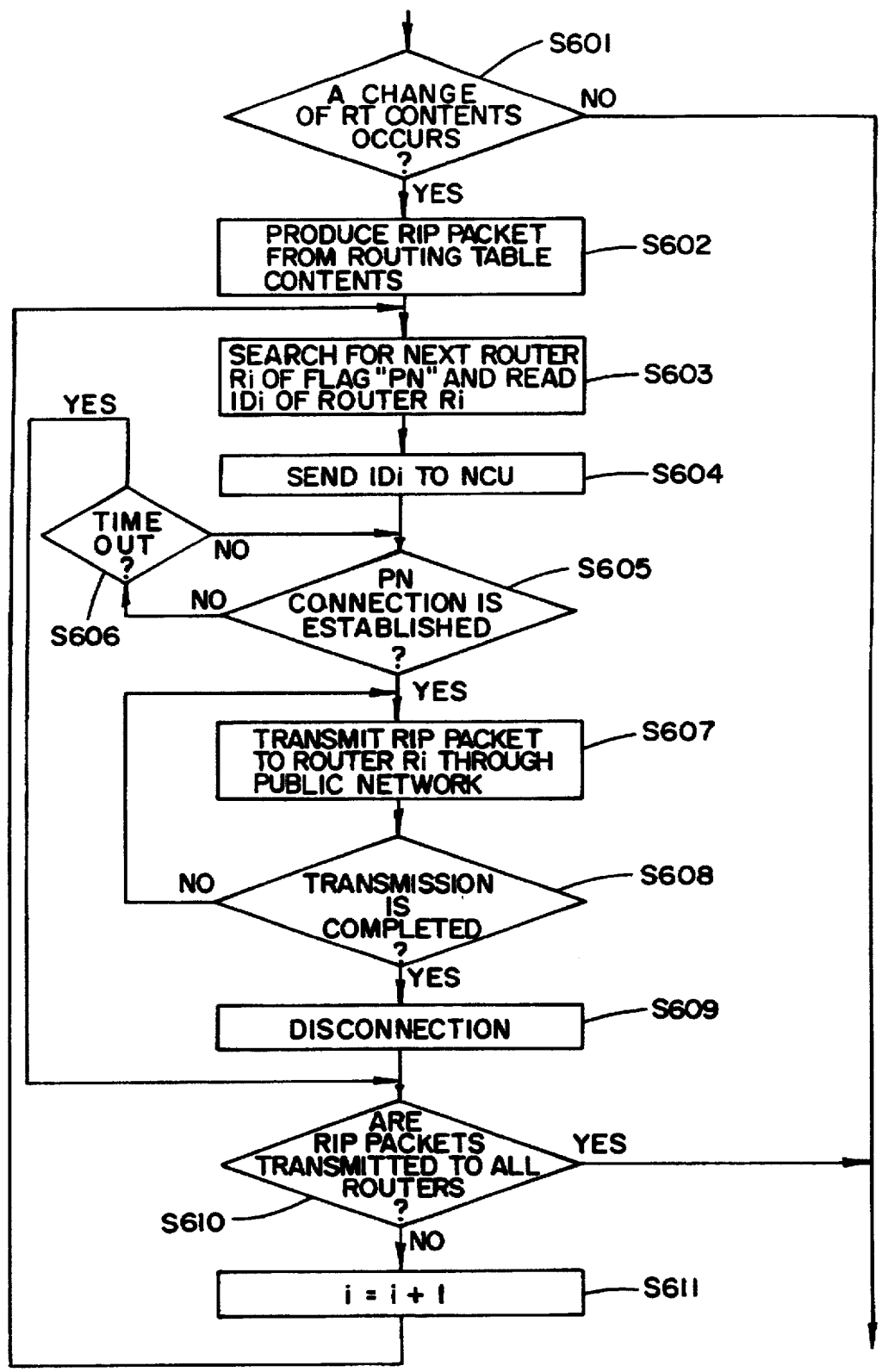
FIG. 6 is a flowchart showing an operation of the embodiment in routing information transmission to routers through the public network.
Figure 7:
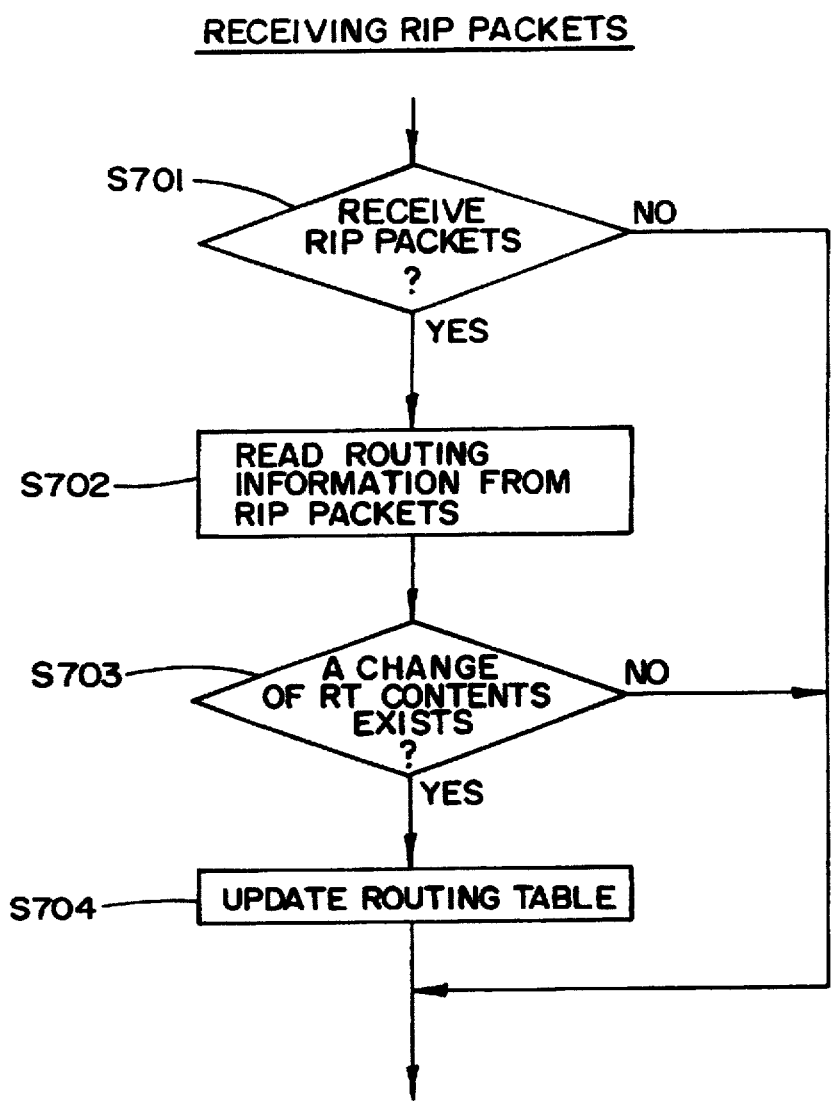
FIG. 7 is a flowchart showing an operation of the embodiment in RIP packet reception.

As shown in FIGS. 5–7, the present embodiment performs the dynamic routing. Referring to FIG. 5, the routing information is transmitted from the router 101 to the adjacent LANs 105a–105c in a predetermined period. When the timer runout occurs (Yes of S501), the routing processor 301 produces RIP (routing information protocol) packets from the routing information stored in the routing table 302 (S502) and then broadcasts the RIP packets to the adjacent LANs 105a–105c through the LAN-IFs 203a–203c, respectively. After that, the timer is reset for the predetermined time period (S504).

Referring to FIG. 6, when the routing information of the routing table 302 is changed, the relevant router transmits the changed routing information to the routers which are connected to the relevant router through the public network 104. As described before, the routing table change monitor 303 monitors the routing table 302. When receiving a change detection signal of the routing information from the routing table change monitor 303 (Yes of S601), the routing processor 301 produces RIP packets from the contents of the routing table 302 according to the Routing Information Protocol (S602).

After initializing a variable i, the routing processor 301 searches the routing table 302 for a first "next router" $R_i$ having a flag of PN and reads out its public ID number $ID_i$ from the "next router address" field of the routing table 302 (S603). The public ID number $ID_i$ is send to the NCU 204 which performs the connection operation through the public network 104 until the time-out occurs (S604–S606). When the public connection is established (yes of S606), the routing processor 301 transmits a RIP packet to the router $R_i$ through the public network 104 until all the RIP packets are completely transmitted (S607 and S608). When the RIP packets transmission to the router $R_i$ is completed (Yes of S608), the public line is disconnected (S609) and then it is checked whether the RIP packets are transmitted to all the routers $R_i$ (S610). If not, the variable i is incremented by one (S611) so that the above steps (S603–S609) are repeated regarding the router $R_{i+1}$. In this manner, the above steps (S603–S611) are repeated until the RIP packets conveying the changed routing information are transmitted to all the routers which corresponds to the respective next routers with a flag of PN registered in the routing table 302 (Yes of S610).

ROUTING INFORMATION RECEPTION

Referring to FIG. 7, when receiving the RIP packets from the LANs 105a–105c or the public network 104 (Yes of S701), the routing processor 301 reads the routing information from the received RIP packets (S702) and then checks whether there is any difference between the received routing information and the contents of the routing table 302 (S703). If a change of the routing table contents exists (Yes of S703), the routing processor 301 updates the routing table 302 using the received routing information (S704).

What is claimed is:

1. A router for connecting a local-area network (LAN) with a public network comprising:

a first interface for transmitting and receiving packets to and from a plurality of LANs;

a second interface for transmitting and receiving packets to and from said public network;

a routing table containing a plurality of routing information sets corresponding to destinations, respectively, each of said routing information sets including a next node address and a flag, said next node address indicating a second router following said router in a route from said router to a destination through one of said LAN and said public network, and said flag representing one of a LAN side and a public network side; and a routing processor for searching said routing table for said second router when a change of said routing information sets is monitored and for determining a path for a packet received from one of said LAN and said public network based on a specified destination of said packet such that said packet is forwarded to said second router through said LAN according to said next node address corresponding to said specified destination when said flag corresponding to said specified destination represents said LAN side and said packet is forwarded to said second router through said public network according to said next node address corresponding to said specified destination when said flag corresponding to said specified destination represents said public network side.

2. The router according to claim 1, wherein said routing processor determines said path such that said packet is forwarded to said LAN when said LAN is said specified destination of said packet.

3. A network comprising:

a public network;

a plurality of local-area networks (LANs); and a plurality of nodes including routers each connecting a LAN with said public network;

each of said routers comprising:

a first interface for transmitting and receiving packets to and from a plurality of LANs;

a second interface for transmitting and receiving packets to and from said public network;

a routing table containing a plurality of routing information sets corresponding to destinations, respectively, each of said routing information sets including a next node address and a flag, said next node address being one of an IP address and a public identification number which indicates a second router following a router in a route from said router to a destination through one of said LAN and said public network, and said flag representing one of a LAN side and a public network side; and a routing processor for searching said routing table for said second router when a change of said routing information sets is monitored and for determining a path for a packet received from one of said LAN and said public network based on a specified destination of said packet such that said packet is forwarded to said second router through said LAN according to said IP address of said second router corresponding to said specified destination when said flag corresponding to said specified destination represents said LAN side and said packet is forwarded to said second router through said public network according to the public identification number of said second router corresponding to said specified destination when said flag corresponding to said specified destination represents said public network side.

4. A network comprising:

a public network;

a plurality of local-area networks (LANs); and a plurality of nodes including routers each connecting a LAN with said public network;

each of said routers comprising:

a first interface for transmitting and receiving packets to and from a plurality of LANs;

a second interface for transmitting and receiving packets to and from said public network;

a routing table containing a plurality of routing information sets corresponding to destinations, respectively, each of said routing information sets including a next router address and a flag, said next router address indicating a second router following a router in a route from said router to a destination through one of said LAN and said public network, and said flag representing one of a LAN side and a public network side;

a monitor for monitoring a change of said routing information sets; and a routing processor for searching said routing table for said second router associated with said flag representing said public network when said change of said routing information sets is monitored so as to transmit said routing information sets changed to said second router.

5. The network according to claim 4, wherein said routing processor periodically transmits said routing information sets to said LANS connected through said first interface.

6. A method for updating routing information in a router for connecting a local-area network (LAN) with a public network, said method comprising the steps of:

storing a plurality of-routing information sets in a routing table, said routing information sets corresponding to destinations, respectively, each of said routing information sets including a next router address and a flag, said next router address indicating a second router following said router in a route from said router to a destination through one of said LAN and said public network, and said flag representing one of a LAN side and a public network side;

monitoring a change of said routing information sets;

searching said routing table for said second router associated with said flag representing said public network when said change of said routing information sets is monitored; and transmitting said routing information sets changed to said second router.

7. The method according to claim 6 further comprising the steps of:

searching said routing table for a specified destination embedded in a received packet;

checking whether said flag of a routing information set corresponding to said specified destination represents said LAN side or said public network side;

determining a path for said received packet such that said packet is forwarded to said next router through said LAN according to said next router address corresponding to said specified destination when said flag represents said LAN side; and determining a path for said received packet such that said packet is forwarded to said next router through said public network according to said next router address corresponding to said specified destination when said flag represents said public network side.

8. The method according to claim 7, further comprising the step of:

determining a path for said received packet such that said packet is forwarded to said LAN when said LAN is said specified destination of said packet.

9. The method according to claim 6, further comprising the step of:

periodically transmitting said routing information sets to said LANs connected to said router.

* * * * *

UNITED STATES PATENT AND TRADEMARK OFFICE
CERTIFICATE OF CORRECTION

PATENT NO. : 5,802,316
DATED : September 1, 1998
INVENTOR(S) : Yuji Ito, et al.

It is certified that error appears in the above-identified patent and that said Letters Patent is hereby corrected as shown below:

Column 4, Line 15: "Indicates" should read --indicates--

Column 6, Line 15, Claim 3: "IP address" should read --IP (Internet Protocol) address--

Column 7, Line 4, Claim 6: "of-routing" should read --of routing--

Signed and Sealed this

Nineteenth Day of September, 2000

Q. TODD DICKINSON

*Attest:*

*Attesting Officer*           *Director of Patents and Trademarks*